UNITED STATES PATENT OFFICE.

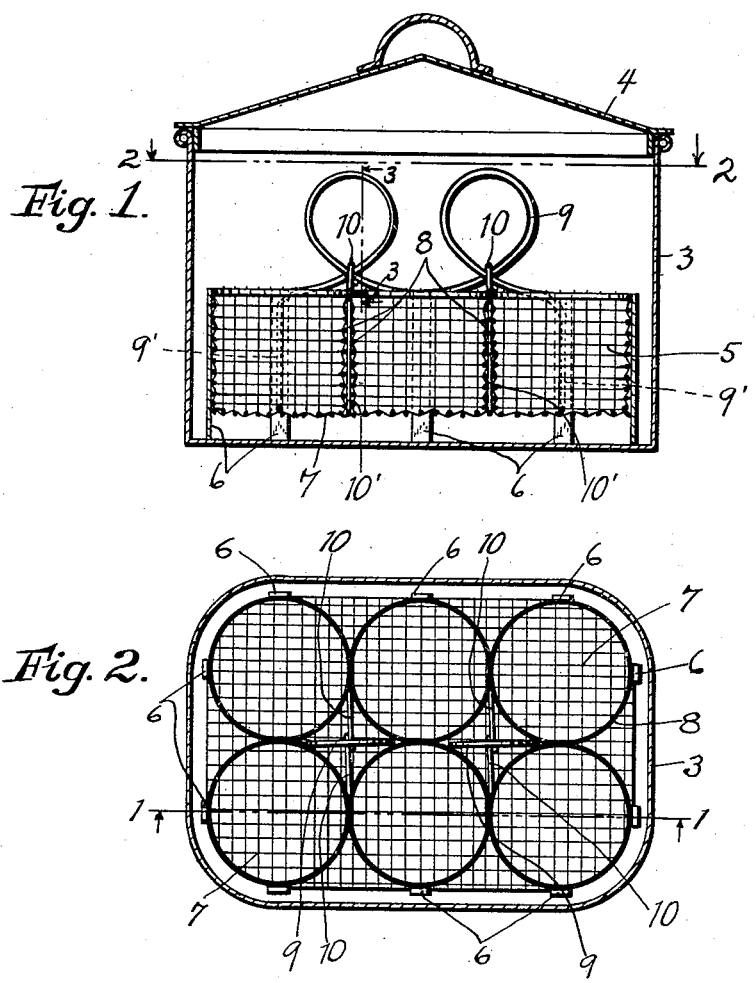

PAULINA GRUNEISEN AND ALBERT GRUNEISEN, OF PLATTEVILLE, WISCONSIN.

FRUIT-STEAMER.

1,070,801.  Specification of Letters Patent.  Patented Aug. 19, 1913.

Application filed October 30, 1912.  Serial No. 728,691.

*To all whom it may concern:*

Be it known that we, PAULINA GRUNEISEN and ALBERT GRUNEISEN, citizens of the United States, and residents of the city of Platteville, county of Grant, and State of Wisconsin, have invented certain new and useful Improvements in Fruit-Steamers, of which the following is a specification.

Our invention relates to fruit steamers and the object of this improvement is to provide a simple and effective device of this character which will be adapted to steam fruit in cans ready for canning in the preparation for such canning.

Other objects will appear hereinafter.

The invention consists in the combinations and arrangements of parts hereinafter described and claimed.

The invention will be best understood by reference to the accompanying drawing forming a part of this specification, and in which—

Figure 1 is a vertical section of a device embodying our invention taken on line 1—1 in Fig. 2, Fig. 2 is a horizontal section of the same taken on line 2—2 in Fig. 1, and Fig. 3 is a section taken on line 3—3 in Fig. 1 illustrating the handle construction.

The preferred form of construction, as illustrated in the drawing, comprises an outer vessel 3 having a removable lid 4 adapted to fit the top portion of the vessel 3 providing a steam tight joint therebetween.

A fruit can holding basket 5 is supported on the bottom of the vessel 3 by means of legs 6 and such legs are secured along the sides of the basket 5 by means of solder, or its equivalent, forming reinforcements therefor. The basket 5 is provided with a bottom 7 which is secured to the posts 6 and spaced above the bottom of the boiler by means of such posts 6. Secured on the top of the bottom 7 are hollow tubular members having foraminated sides 8 forming individual can holding compartments. The tubular members 8 and the bottom 7 are preferably formed of wire cloth or other reticulate substance.

A bail 9 is looped as indicated in the drawing and provided to facilitate handling the basket 5. The end portions 9' of the handle 9 are extended between adjacent sides of the pairs of end tubular sides 8 and secured therebetween by means of solder, or its equivalent, forming reinforcements therefor. Reinforcing members 10 are bent around portions of the handles 9 as clearly indicated in Fig. 3 and their ends 10' secured between the tubular sides 8 as shown in the drawings forming reinforcements therebetween.

It will be seen that with this construction the cans will be maintained, each in a separate compartment from the others and separated by walls 8 and a wire 9' or 10' thus preventing the cans falling over or contacting each other while in the steaming process.

In operation, the fruit cans are filled with raw fruit and each can inserted in a compartment surrounded by its wall 8 and the basket 5 manually placed in the vessel 3, by means of handle 9. The vessel 3 is provided with a small quantity of water and heat applied to convert a portion of this water into steam. The lid 4 is placed in position to keep the steam in the vessel 3 during the process of steaming.

With the use of this device, fruits may be canned in their whole state and the flavor and color of the fruits retained.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having described our invention what we claim as new and desire to secure by Letters Patent is:—

A basket comprising a bottom; hollow foraminated tubular members secured to said bottom; supporting legs secured to outer sides of said tubular members; a wire bail bent over to form loops and having its ends extending between the inner contacting sides of the end tubular members; reinforcing wires bent around the wire bail at the loop intersecting portions and having their end portions secured between the inner contacting sides of the side tubular members, substantially as described.

In testimony whereof we have signed our names to this specification in the presence of two subscribing witnesses.

PAULINA GRUNEISEN.
ALBERT GRUNEISEN.

Witnesses:
S. J. FLYNN,
M. B. GIBBONS.

Copies of this patent may be obtained for five cents each, by addressing the "Commissioner of Patents, Washington, D. C."